April 14, 1953     H. HIEB     2,635,011
MEANS FOR SECURING WHEELS TO TUBULAR LEGS
Filed Dec. 4, 1950
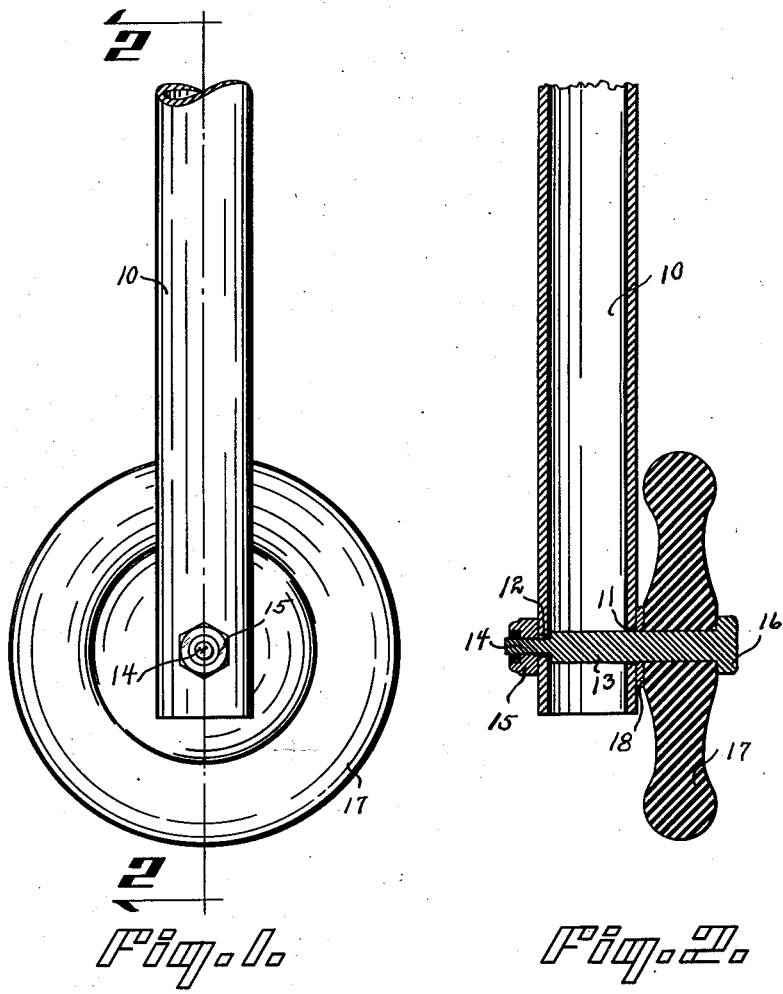
Inventor
Herbert Hieb
by M. Talbert Dick
Attorney
Witness
Merle A. Bjork Patented Apr. 14, 1953

2,635,011

UNITED STATES PATENT OFFICE 2,635,011

MEANS FOR SECURING WHEELS TO TUBULAR LEGS

Herbert Hieb, Des Moines, Iowa

Application December 4, 1950, Serial No. 198,995

1 Claim. (Cl. 301—1)

This invention relates to a wheel mounting for rotatably securing supporting wheels to tubular members.

Manufacturers have always had difficulty in securing wheels to tubular legs, shafts and like, but this difficulty has been greatly increased in recent times by the utilization of soft metals such as aluminum for equipment supporting legs. After the wheel carriage is inserted into the aluminum tube, there is a spreading and wearing problem during use. Furthermore, such structure is complicated, costly in manufacture, and the supporting wheel is not permanently secured to the leg. If the wheel shaft is inserted, transversely through the tubular leg, the soft metal either collapses in use or rapidly wears the bearing holes to such an extent that the wheel will not be properly secured to the leg but will become loose and wobbly relative to the leg.

Therefore, the principal object of my invention is to provide a simple means for rigidly securing a wheel shaft through and to the lower end portion of a tubular leg or like.

A further object of this invention is to provide a means for securing a wheel to a tubular leg that is refined in appearance, economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claim and illustrated in the accompanying drawings, in which:

Fig. 1 is a front view of a wheel and a tubular leg with the wheel shaft secured to the leg by my invention.

Fig. 2 is a longitudinal sectional view of the invention taken on line 2—2 of Fig. 1.

Referring to the drawings I have used the numeral 10 to designate a tubular leg. The numeral 11 designates a hole in the side wall of the tubular leg. The numeral 12 designates a second hole in the wall of the tubular leg diametrically positioned from the hole 11 and of a diameter less than the diameter of the hole 11. The numeral 13 generally designates the wheel shaft having at one end a reduced portion 14 designed to detachably receive the nut 15. The numeral 16 designates a head portion on the other end of the wheel shaft as shown in Fig. 2. The numeral 17 designates a wheel designed to be rotatably mounted on the shaft and adjacent the head 16. The numeral 18 designates an ordinary washer.

To assemble the wheel on the tubular shaft, the wheel is placed on the shaft and the washer is then placed on the wheel shaft so that it will reside between the wheel and the leg after the assembly has been completed. Next, the shaft is inserted through the hole 11 with its reduced end extending through the hole 12. The diameter of the main portion of the wheel shaft is substantially that of the diameter of the hole 11 and the reduced end of the shaft is substantially that of the diameter of the hole 12. The nut is then placed on the threaded reduced end of the shaft and tightened, thereby rigidly and successfully clamping the side wall of the tubular leg between the shoulder of the shaft and the nut as shown in Fig. 2. With the wheel shaft thus rigidly clamped and fastened to the tubular leg, the entire assembly is strengthened and the wheel shaft will be prevented from movement in any direction relative to the tubular leg. The wheel shaft becomes therefore a rigid part of the leg and the wheel rotates on the shaft. As the shaft is rigidly secured to the leg, it cannot rotate relative to the leg and wear the relatively soft and thin wall of the leg. I have found that by such a structure a relatively light tubular leg will successfully support heavy loads without wear or collapsing moments. To remove the wheel assembly, it is merely necessary to remove the nut and withdraw the wheel and wheel shaft.

While the reduced end portion of the shaft provides a shoulder on the shaft for engaging the inside wall of the tubular leg, other means beside the shoulder may be employed for engaging the inner side of the leg.

Some changes may be made in the construction and arrangement of my means for securing a wheel to a tubular leg without departing from the real spirit and purpose of my invention, and it is my intention to cover by my claim, any modified forms of structure or use of mechanical equivalents which may be reasonably included within their scope.

I claim:

A light weight, thin walled tubular member having two opposite holes, one of which is of a diameter smaller than the diameter of the other, a shaft having a reduced threaded end with its main portion extending through the larger of said two holes and its reduced end extending through the smaller of said two holes, a nut threaded onto the reduced end of said shaft outside of said tubular member and clamping the wall of said tubular member adjacent said smaller hole between itself and the main portion of said shaft whereby said shaft will be rigidly secured to one side of said tubular member and will loosely extend through the opposite wall of said tubular member, a head portion on the end of said shaft opposite from its reduced end, and a wheel on said shaft between said head and the outside of said tubular member.

HERBERT HIEB.

References Cited in the file of this patent

UNITED STATES PATENTS

| Number | Name | Date |
|---|---|---|
| 321,695 | Dean | July 7, 1885 |
| 639,178 | Maddox | Dec. 12, 1899 |
| 1,661,815 | Britt | Mar. 6, 1928 |
| 2,123,388 | Vigueri | July 12, 1938 |

FOREIGN PATENTS

| Number | Country | Date |
|---|---|---|
| 450,539 | France | Mar. 27, 1913 |